United States Patent [19]

Whitcomb

[11] Patent Number: 4,497,132
[45] Date of Patent: Feb. 5, 1985

[54] AIR-ROOT-PRUNING CONTAINER

[75] Inventor: Carl E. Whitcomb, Stillwater, Okla.

[73] Assignee: Board of Regents for the Oklahoma Agricultural and Mechanical Colleges Acting for and on Behalf of Oklahoma State University, Stillwater, Okla.

[21] Appl. No.: 309,085

[22] Filed: Nov. 9, 1981

[51] Int. Cl.³ .............................................. A01G 9/02
[52] U.S. Cl. ....................................................... 47/66
[58] Field of Search ..................................... 47/87, 66

[56] References Cited

U.S. PATENT DOCUMENTS

| 805,491 | 11/1905 | Sedlacek | 47/66 |
| 3,035,623 | 5/1962 | Goetz | 47/66 |
| 3,667,159 | 6/1972 | Todd | 47/87 |
| 4,006,558 | 2/1977 | Neddo et al. | 47/77 |
| 4,223,480 | 9/1980 | Welty | 47/66 |

Primary Examiner—Robert A. Hafer
Assistant Examiner—Bradley M. Lewis
Attorney, Agent, or Firm—Head, Johnson & Stevenson

[57] ABSTRACT

A vertical air-root-pruning container involving a series of vertical offsets or air gaps displaced around the sidewall of a container. The offsets or air gaps are alternately displaced outwardly or inwardly to air-prune spiral root growth in both right and left directions. Such a container inhibits spiral growth, promotes root branching, and results in more even root distribution as well as increased root growth in the growing medium.

11 Claims, 8 Drawing Figures

AIR-ROOT-PRUNING CONTAINER

BACKGROUND OF THE INVENTION

1. Field of the Invention

This invention relates to an improved nursery or greenhouse container or pot. More specifically, the invention relates to an apparatus and method for vertical air-root-pruning of plants grown in containers.

2. Description of the Prior Art

Plants have long been grown in pots in greenhouses and homes. The practice of producing large numbers of plants out-of-doors in containers has developed primarily since the early 1950's. The container nursery industry began in southern California and spread across the southern states. The #10 food can with a few holes punched in the bottom was widely used and soon became known as the "one gallon container". During the sixties and seventies, the container nursery industry increased rapidly for several reasons: (1) landscape plants grew at a faster rate in containers than in the field; (2) turnover time decreased; (3) the root system of the plant remained undisturbed; thus, planting could be done anytime, not just during the early spring as with bare root or balled-in-burlap nursery stock; and (4) ease of display and handling made container grown plants attractive to the consumer.

However, development of the container nursery industry was not without problems. The complex nutritional requirements of plants grown in containers took years to define. In addition, growing media was refined until the quality of plant growth in containers attained that of field grown plants. The medium for the container evolved from field soil, to mixes of field soil and compost, to soilless mixes with far greater pore space for providing oxygen to the root system.

Numerous articles have been written and a common topic at gatherings of nurserymen is root development, especially of woody plants, in containers. As a root grows from a cutting or seedling in a container, its path is outward (towards the side of the container) and downward. When the root reaches the side of a round container it follows the contour and generally after one half to one full circle, reaches the bottom where it may continue to elongate and circle, sometimes for five or more revolutions, all of which is considered to be deleterious to the plant.

In "Growth of *Carissa grandiflora* 'Boxwood Beauty' in varying media, containers, micronutrient levels", *The Florida Nurseryman*, 17(4):12-13, 43 (1972), Whitcomb tried placing holes in the sides of containers to improve root growth but without success (see also U.S. Pat. No. 3,785,088). Later studies with tree seedlings grown in square bottomless containers on a raised wire bench showed that air-pruning was effective in stopping root elongation and wrapping at the bottom of the container and, at the same time, in stimulating lateral branch root development following the death of the root tip, Davis et al, "Effects of Propagation Container Size on Development of High Quality Tree Seedling", *Proc. Int. Plant Prop. Soc.;* 25:448:453 (1975). More recent studies showed that Bur oak trees (*Quercus macrocarpa*) grew larger and developed a more fibrous root system in a square bottomless container than in a conventional round container of the same volume, Hathaway and Whitcomb, "The Effects of Root Malformation during Propagation on Growth and Survival of Bur Oak", Research Report P-760, Oklahoma Agricultural Experimental Station, Oklahoma State University, pages 33–34 (1977). Unfortunately, growing plants in bottomless containers on raised wire benches is neither practical nor economical. Birchell and Whitcomb, "Effects of Container Design on Root Development and Regeneration", Research Report P-760, Oklahoma Agricultural Experimental Station, Oklahoma State University, pages 39–45 (1977) compared the growth of birch trees grown in bottomless containers with vertical ribs on the sides. The vertical ribs stopped the circling or the wrapping of the roots of a fine, fibrous rooted species such as the birch. In addition, when the vertical ribs were present, there was no advantage to removing the bottom of the container for air-pruning. Dickinson and Whitcomb, "Effects of Container Design on Root Quality", Research Report P-760, Oklahoma Agricultural Experimental Station, Oklahoma State University, pages 35–36 (1977) tried placing ribs across the bottom of a round container and vertical ribs one fourth to one half the height of the sidewall of the container in order that the container could be nested for stacking and shipping. Japanese black pine (*Pinus thunberi*) and bald cypress (*Taxodium distishum*) trees were grown in these containers for one growing season. The vertical ribs in the lower one fourth or one half of the container were effective in stopping circling of the pine roots; however, the more coarsely rooted cypress either bent the rib and continued to circle or was stopped by the rib from circling but continued to elongate creating a "tangled ball of string" effect.

Dickinson and Whitcomb, "The Effects of Spring Versus Fall Planting on Establishment of Landscape Plants", *S.N.A. Nursery Research Journal* 4(1):9-19 (1977) observed that the roots of container grown plants that developed following planting were extensions of roots that were already present in the container at the time of planting, and were not "new" roots. They suggest that the number of root tips present at planting time may be very important to the rapid establishment and frequently the survival of the container grown plants in the landscape.

These studies showed that the root system of a plant grown in a container could be improved (a) as in the case of bottomless containers on a wire bench and (b) that vertical ribs on the inside of the container could improve the root structure of fine, fibrous rooted plants, but only worsened the problem for strong, coarsely rooted plants. Also, neither improvement was practical for the production of nursery stock on a commercial scale.

SUMMARY OF THE INVENTION

In view of the problems associated with root development in plants grown in containers, I have discovered an improved container adapted to contain a growing medium and a plant comprising:

(a) a bottom wall;

(b) a circumferential upwardly extending sidewall attached to the perimeter of the bottom wall thus forming an open-topped container; and (c) one or more vertical air-root-pruning means displaced in the sidewall to air-prune roots of the plant thus inhibiting the tendency of the roots to grow in a spiral and stimulating additional root branching.

The present invention further provides that a plurality of vertical air-root-pruning means be a vertical slit in the sidewall with one edge of the slit displacement outwardly or inwardly, and extending to the bottom of the container, thus creating an offset or air gap which prunes roots directed into the gap along the inner surface of the container. It is further provided that the outwardly or inwardly extending edges of consecutive slits distributed around the sidewall alternate between the right edge and the left edge such as to prevent spiraling of the roots in both the clockwise and counterclockwise directions.

Thus the present invention provides in a process for growing a plant in a growing medium contained in a pot having a bottom and a circumferential sidewall the specific improvement comprising the step of air-pruning the roots of the plant along one or more vertical slits in the sidewall thus inhibiting the tendency of the roots to grow in a spiral and stimulating additional root branching.

It is an object of the present invention to provide a container that air-prunes the roots of the plant growing in the container. It is a further object that this air-pruning take place along vertical regions distributed around the container sidewalls such as to prevent spiral root growth and such as to promote root branching. It is a further object that the container be consistent and essentially interchangeable with containers presently used in the commercial container industry for growing plants. Fulfillment of these objects and the presence and fulfillment of other objects will be readily apparent upon complete reading of this specification and claims taken in conjunction with the attached drawing.

DESCRIPTION OF THE PREFERRED EMBODIMENT

Figure 1:
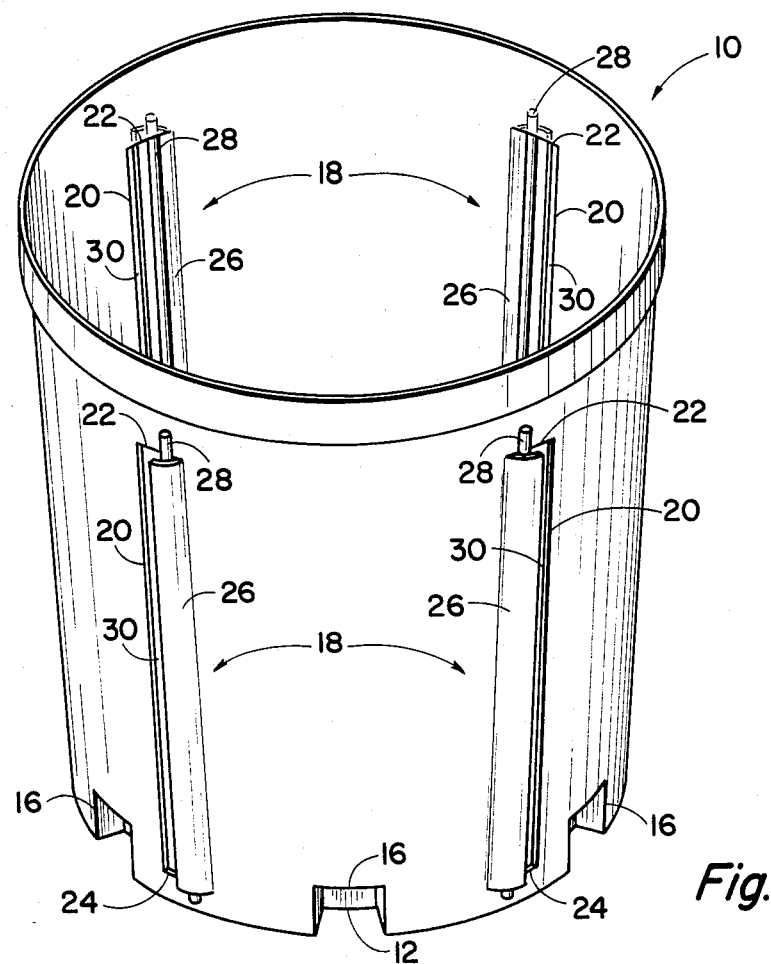
FIG. 1 is a side view of a vertical air-root-pruning container according to the present invention.

The air-root-pruning container of the present invention, how it functions and how it differs from other nursery stock containers can perhaps be best explained and understood by referencing the drawing.

Figure 2:
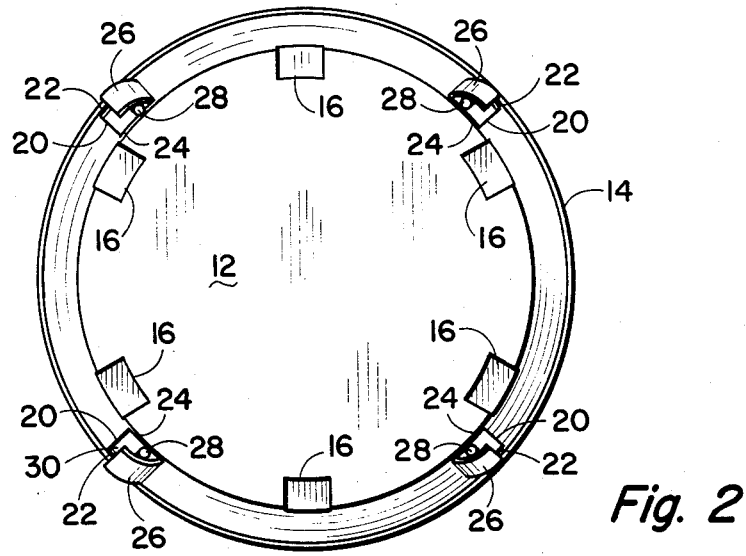
FIG. 2 is a bottom view of the container of FIG. 1.
Figure 3:
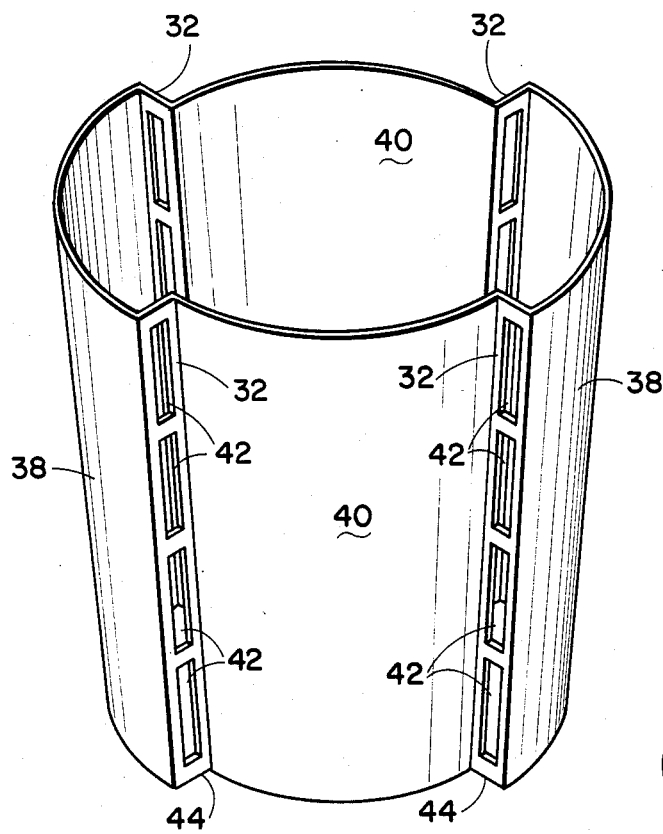
FIG. 3 is a side view of an alternate embodiment of the vertical air-root-pruning container according to the present invention.

FIGS. 1 and 2 illustrate one embodiment of an air-root-pruning container according to the present invention generally designated by the numeral 10. The container 10 is made up of a circular flat bottom 12 and a circumferential upwardly extending sidewall 14 attached to the perimeter of the bottom 12. Displaced around the lower portion of the sidewall 14 is a series of drain holes 16. As illustrated, four vertical air-root-pruning means 18 are evenly distributed around the sidewall 14 (approximately every six inches for a one gallon container). With a larger container, say 12 inch diameter, there would need to be six vertical slits to give optimum air-root-pruning. Likewise, in a smaller pot only two or three slits may be needed. Each vertical air-root-pruning means 18 involves making a cut or slit 20 vertically in the sidewall 14, preferably extending to the bottom 12 of the container, with two horizontal cuts or slits 22 and 24 at either end of the vertical cut 20. The inner flap 26 created by the slits 20, 22 and 24 is then pushed outward to the container 10 and held in this position by placing or wedging a rigid rod 28 between the outer surface of flap 26 and the inner surface of the sidewall above and below the flap 26. This may also be accomplished by allowing narrow sections of the plastic used in the manufacture of the pot to remain in the slit and hold the slit open as shown in FIG. 3. Alternately, the flap 26 can be pushed inward and again held in place by a rigid rod or the like. In this manner a vertical gap 30 is created which will air-prune the roots of the plant growing in the container, thus inhibiting the tendency for roots to grow in a spiral. As shown, the vertical air gap 30 and flaps 26 are alternated such as to air-prune spiral root growth in both the right and left (clockwise and counterclockwise) directions. The width of the vertical opening may be as narrow as one eighth inch or less for fine-rooted plants or as large as one fourth inch or more for coarse-rooted plants.

Figure 5:
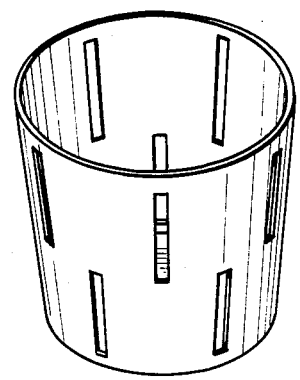
FIG. 5 is another alternate embodiment.
Figure 4:
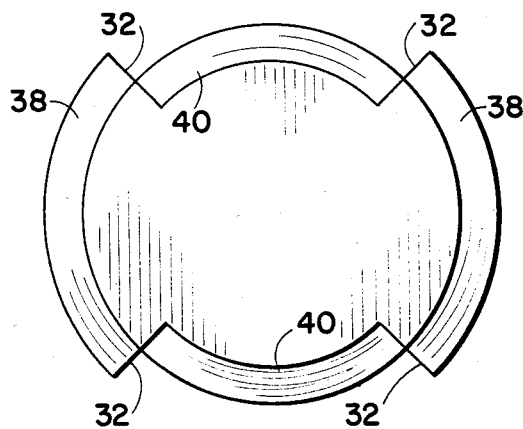
FIG. 4 is a top view of the container of FIG. 3.

FIGS. 3 and 4 illustrate an alternate embodiment wherein the air-root-pruning means 32 are molded directly into the container. In this embodiment, the sidewall is made up of two pairs of concentric quadrants 38 and 40 of slightly different and alternating radii. Vertical openings 42 present in the narrow vertical radial walls 44 located between the adjacent concentric sidewall quadrants 38 and 40 are equivalent to the air-root-pruning gaps of FIGS. 1 and 2. FIG. 5 illustrates still another embodiment wherein the vertical air-root-pruning means are staggered about and molded into the sidewall of the container. The vertical openings in the container sidewall do not have to be continuous from top to bottom to be effective. Some sections of the vertical sidewall may remain in place to add strength to the container.

EXAMPLE

Figure 6:
FIG. 6 is a photograph of root development of a pyracantha shrub grown in a container of the present invention on the left compared with one grown in a conventional container on the right.
Figure 7:
FIG. 7 is a close-up view of the root branching of the plant on the left of FIG. 6.
Figure 8:
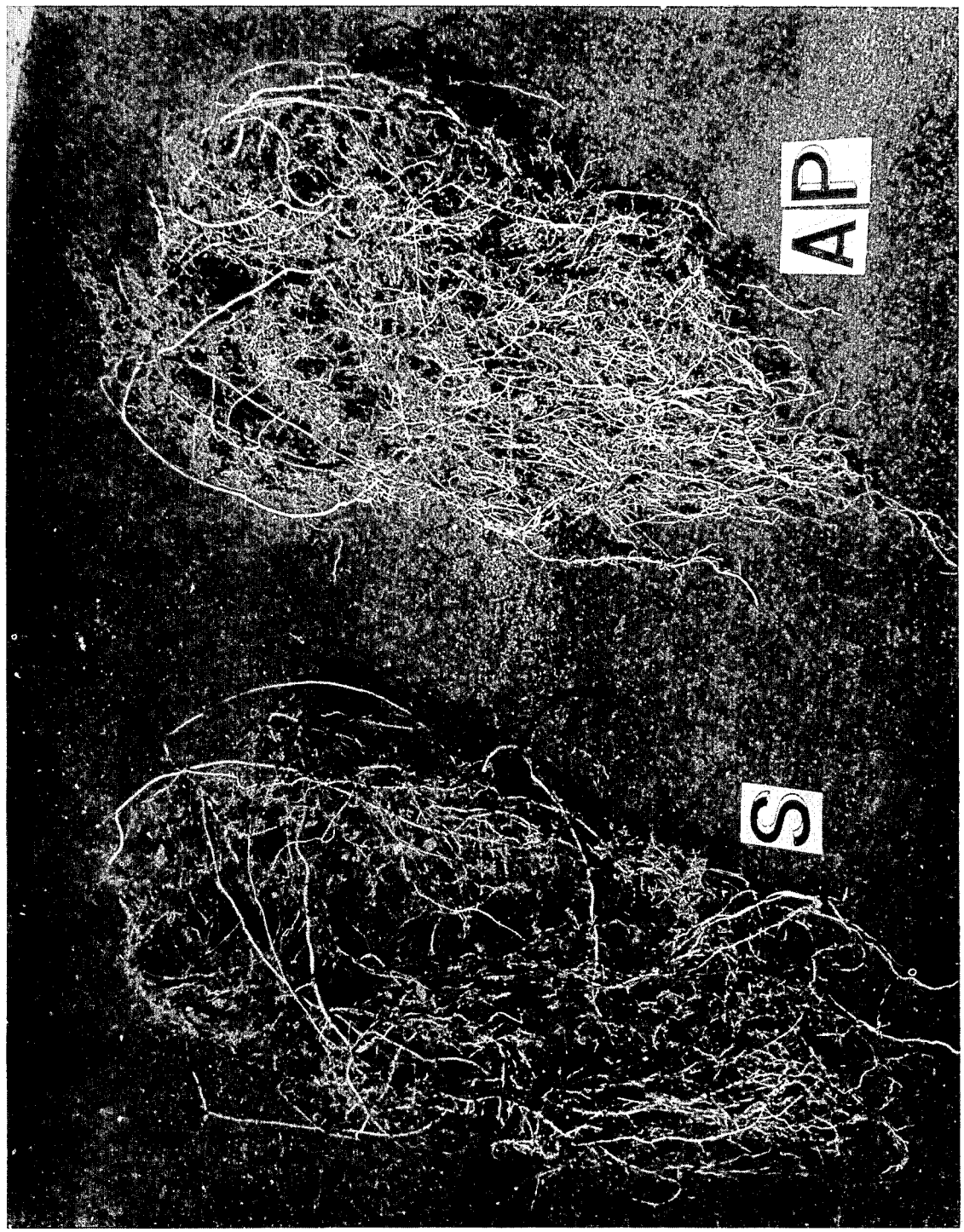
FIG. 8 is a photograph of the root development, less the top of the plant and the growing medium, for the standard container ("S", left) and the air-root-pruning container ("AP", right).

In order to demonstrate the beneficial effects of vertical air-pruning according to the present invention, Pyracantha X 'Mojave' plants were grown in standard pots and in air-root-pruning containers of equal size under identical and simultaneous growing conditions for three months. At the end of this period some of the plants were removed from their respective containers and were visually examined and photographed. FIG. 6 is a photograph of the root development of a pyracantha shrub grown in a container with vertical slits (left) and one grown in a conventional round two gallon container (right). Some of the roots in the conventional container circle halfway or more around the container even though the plant was only three months old. FIG. 7 is a close-up photograph of the root development of the pyracantha shrub shown on the left in FIG. 6. The root development is stopped at the vertical slits in the sides of the containers and branching of the root behind the tip is stimulated. FIG. 8 is a photograph of root development, less the top of the plant and the growing medium, of the pyracantha plant grown in the standard pot (left) and grown in the air-root-pruning container (right). It can be observed that greater root growth has occurred in the air-root-pruning container.

In order to quantitatively establish the observed differences in plant growth, the number of branches per plant was counted and the weight of top growth and root growth was measured for a representative set of plants. A second representative set of each type of container grown plant was transplanted into larger containers and allowed to grow for an additional ten (10) days under identical conditions. The plants were then removed from the larger containers such that the number of two inch long roots could be counted. The respective data is presented in TABLE I below.

TABLE I

Effects of vertical air-root-pruning on growth of Pyracantha X 'Mojave'

|  | Standard Pot | Air-Prune Pot | % Increase |
|---|---|---|---|
| Branches/plant | 12.5 | 32.5 | 158% |
| No. of roots 2" long 10 days after transplant | 44 | 126 | 187% |
| Top weight (g) | 93.3 | 152 | 63% |
| Root weight (g) | 109 | 192 | 38% |

As clearly indicated by the data, all critical growth parameters quantitatively favor the use of the air-root-pruning container. With plants grown in the conventional container, only a few root tips exist at the bottom of the container (see FIG. 6). At the time of planting in the landscape, these root tips extend into the surrounding soil. Thus, in the case of the plant grown in the vertical air-root-pruning container, the marked increase in the number of root tips existing at planting time results in accelerated establishment of the plant in the landscape. The more even distribution of root development throughout the container medium, instead of most roots developing in a spiral pattern on the very bottom of the container, further promotes accelerated establishment of the plant. Stimulated branch root development enhances further plant growth by increasing the root surface area which in turn promotes increased absorption of water and nutrients.

Additional advantages associated with the use of the air-root-pruning container of the present invention include the fact that the container has a conventional bottom for ease of filling, handling, and shipping. The containers can be filled by existing commercial pot fillers without modification. And, the containers will nest or stack such that freight costs for shipping the containers from manufacturers to nurserymen will not be increased.

Having thus described the preferred embodiments with a certain degree of particularity, it is manifest that many changes can be made in the details of construction arrangement and fabrication of the elements without departing from the spirit and scope of the invention. Therefore, it is to be understood that the invention is not limited to the embodiments set forth therein for purposes of exemplification, but is to be limited only by the scope of the attached claims, including the full range of equivalents to which each element thereof is entitled.

I claim:

1. A container adapted to contain a growing medium and a plant comprising:
    (a) a bottom wall;
    (b) a circumferential upwardly extending sidewall attached to the perimeter of said bottom wall thus forming an open-topped container; and
    (c) one or more vertical air-root-pruning means displaced in said sidewall forming an air gap offset from said sidewall, to air-prune roots of said plant thus inhibiting the tendency of said roots to grow in a spiral and stimulating additional root branching.

2. A container of claim 1 further comprising a plurality of vertical air-root-pruning means displaced in said sidewalls to air-prune roots of said plant thus inhibiting the tendency of said roots to grow in a spiral and stimulating additional root branching.

3. A container of claim 1 or 2 wherein said vertical air-root-pruning means is a vertical slit in said sidewall with one edge of said slit displaced outwardly or inwardly from said sidewall, thus creating an offset flap and air gap which prunes roots directed into said gap along the inner surface of said container.

4. A container of claim 2 wherein said vertical air-root-pruning means are vertical slits in said sidewall with alternating edges of said slits displaced outwardly or inwardly thus creating offsets or air gaps which prune roots directed into said gaps along the inner surface of said container either clockwise or counterclockwise respectively.

5. A container of claim 4 wherein said slits have small horizontal cuts at the top and bottom and said edge is displaced outwardly or inwardly and held by a rigid rod extending between said horizontal cuts on the interior of said container sidewall but on the interior or exterior of said outwardly or inwardly displaced edge.

6. A container of claim 4 wherein said slits displaced outwardly or inwardly are molded into said sidewall and extend to the bottom of the container.

7. A container of claim 5 or 6 wherein a plurality of vertical vertical air-root-pruning means are provided and displaced about said sidewalls.

8. A container of claim 7 wherein there are four of said vertical air-root-pruning means.

9. In a process for growing a plant in a growing medium contained in a pot having a bottom and a circumferential sidewall, the specific improvement comprising the step of air-pruning roots of said plant along at least one vertical slit in said sidewall, said slit forming an air gap offset from said sidewall, said air gap thus inhibiting the tendency of said roots to grow in a spiral and stimulating additional root branching.

10. A process of claim 8 wherein said air-pruning is performed at a plurality of vertical slits distributed around said sidewall.

11. A process of claim 9 wherein said vertical slits have alternating right and left edges displaced outwardly or inwardly to said container thus air-pruning both the clockwise and counterclockwise spiral growth of said roots.

* * * * *